(12) United States Patent
Ehmann

(10) Patent No.: US 8,341,436 B2
(45) Date of Patent: Dec. 25, 2012

(54) METHOD AND SYSTEM FOR POWER-STATE TRANSITION CONTROLLERS

(75) Inventor: Greg Ehmann, San Jose, CA (US)

(73) Assignee: ST-Ericsson SA, Plan-les-Ouates (CH)

( * ) Notice: Subject to any disclaimer, the term of this patent is extended or adjusted under 35 U.S.C. 154(b) by 908 days.

(21) Appl. No.: 12/258,221

(22) Filed: Oct. 24, 2008

(65) Prior Publication Data

US 2009/0132835 A1   May 21, 2009

Related U.S. Application Data

(63) Continuation-in-part of application No. PCT/IB2007/051540, filed on Apr. 26, 2007.

(60) Provisional application No. 60/795,909, filed on Apr. 26, 2006.

(51) Int. Cl.
*G06F 1/00* (2006.01)
*G06F 1/26* (2006.01)
*G06F 1/32* (2006.01)
*G06F 9/30* (2006.01)
*G06F 9/40* (2006.01)

(52) U.S. Cl. ........ 713/300; 713/320; 713/323; 712/200; 712/208

(58) Field of Classification Search .................. None
See application file for complete search history.

(56) References Cited

U.S. PATENT DOCUMENTS

| 5,388,267 | A  | * | 2/1995  | Chan et al. ......................... 713/2 |
| 5,692,204 | A  |   | 11/1997 | Rawson et al. |
| 6,393,573 | B1 |   | 5/2002  | Gillespie et al. |
| 6,446,213 | B1 |   | 9/2002  | Yamaki |
| 6,714,891 | B2 |   | 3/2004  | Dendinger |
| 6,918,045 | B2 | * | 7/2005  | Chen et al. ..................... 713/310 |
| 7,126,608 | B2 | * | 10/2006 | Alben et al. .................. 345/501 |
| 2002/0083356 | A1 | * | 6/2002 | Dai ............................... 713/322 |
| 2003/0065497 | A1 | * | 4/2003 | Rhoads ........................... 703/18 |
| 2004/0215989 | A1 |   | 10/2004 | Kawano et al. |

FOREIGN PATENT DOCUMENTS

| WO | 02/29535  | A2 | 4/2002 |
| WO | 03/027817 | A2 | 4/2003 |

* cited by examiner

*Primary Examiner* — Ji H Bae
(74) *Attorney, Agent, or Firm* — Potomac Patent Group PLLC

(57) ABSTRACT

Power-state transitioning arrangements are implemented using a variety of methods. Using one such method, a power-state transitioning circuit arrangement is implemented having a processing circuit that does not include an arithmetic logic unit. A power-state transition script including instructions from an instruction set is stored in a memory circuit. The processing circuit implements the power-state transition script to facilitate a change in a power-state of another processor circuit.

21 Claims, 4 Drawing Sheets

METHOD AND SYSTEM FOR POWER-STATE TRANSITION CONTROLLERS

BACKGROUND

1. Technical Field

The present invention relates generally to processor power-state transitions and, more particularly, to programmable power-state transition controllers for facilitating power-state transitions.

2. Description of the Related Art

Technical advances have enabled faster and more powerful processors to be used in a variety of applications. Often the increases in speed and processing power come at the expense of increased power consumption and processor size. In some applications, the increased power consumption is a potential issue, such as applications that have limited power sources. To address the concerns related to the increased power consumption, some processor systems implement one or more power saving modes. The system enters the power saving modes to save power or to reduce the amount of heat generated. Examples of such power-saving modes are taught by U.S. Pat. No. 6,714,891 (Method and Apparatus for Thermal Management of a Power Supply to a High Performance Processor in a Computer System), U.S. Pat. No. 6,393,573 (Power Management for Automotive Multimedia System) and U.S. Pat. No. 6,446,213 (Software-Based Sleep Control of Operating System Directed Power Management System with Minimum Advanced Configuration Power Interface (ACPI)-Implementing Hardware) and are fully incorporated herein by reference.

Power-saving modes are sometimes implemented by transitioning the frequency of the processor clock or by varying an input voltage of the processor. The transitions are often facilitated using hardwired circuits. These hardwired circuits can be constructed so as to require minimal control from the processor and can be designed for minimal power consumption. However, the hardwired circuits are difficult to implement because they do not allow for simple modifications after they are created. Thus, they must be redesigned whenever the transition protocol changes due to a change in the application or the processor.

The power-state transitions can also be facilitated using software executed by the main processor. This solution can be problematic because the processor must devote some of its processing time to the transition, which can cause undesirable performance issues in applications where the processor is expected to provide real-time responses. Additionally, the extra processing required by the processor consumes even more power.

Another solution is to facilitate the power-state transitions using a programmable logic device. Programmable logic devices provide flexibility in their functionality; however, they often consume excess power because they are designed for multiple uses. For instance, programmable logic devices often have excess circuitry to facilitate modification of their internal configuration. Moreover, programmable logic devices typically have unused logic.

These and other limitations present challenges to the implementation of processor power management.

BRIEF SUMMARY

Various aspects of the present invention are directed to methods and arrangements for implementing processor power state transitions in a manner that addresses and overcomes the above-mentioned issues.

Consistent with one example embodiment, the present invention is directed to a power-state transitioning circuit arrangement having a processing circuit that does not include an arithmetic logic unit. A power-state transition script that uses an instruction set is stored in a memory circuit. The processing circuit implements the power-state transition script to facilitate a change in a power-state of another processor circuit.

Consistent with another example embodiment, the present invention is directed to a power-state transitioning processor arrangement that has an instruction set having a write instruction, a conditional jump instruction, a delay instruction and a handshake instruction. Instructions from the instruction set are stored in a configurable memory circuit and implemented by a secondary processor to facilitate a power-state transition of a main processor circuit. The secondary processor is integrated with the main processor circuit.

Consistent with a further example embodiment, the present invention is directed to power-state transitioning circuit arrangement that has a memory circuit for storing a power-state-transition script. The power-state-transition script is based upon an instruction set having a write instruction, a delay instruction, a conditional jump instruction and a handshake instruction and is used for effecting power-state transitions. The power-state transitioning circuit arrangement also includes a processing circuit for implementing the power-state transition script and for providing a power-state transition for another processing circuit.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE SEVERAL VIEWS OF THE DRAWINGS

The invention may be more completely understood in consideration of the following detailed description of various embodiments of the invention in connection with the accompanying drawings, in which.

DETAILED DESCRIPTION

Figure 1:
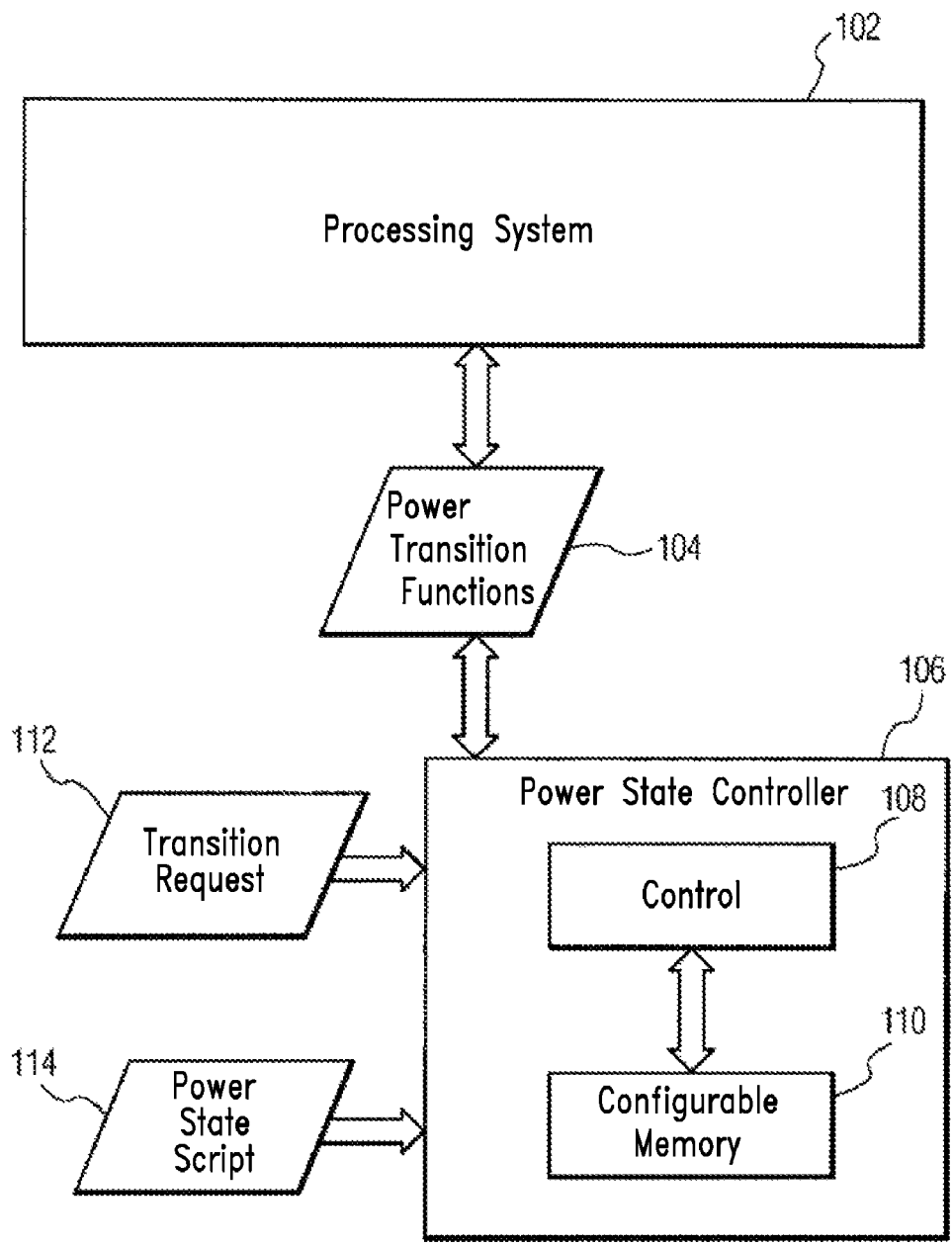
FIG. 1 is block diagram of a processor power management system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of circuits and approaches involving facilitating power mode transitions. While the present invention is not necessarily limited to such applications, an appreciation of various aspects of the invention is best gained through a discussion of examples in such an environment.

Consistent with an example embodiment of the present invention, a power-state controller is used to facilitate a power-state transition of a main processor (i.e., other than the power-state controller). The power-state controller is implemented using a set of instructions that are designed for facilitating power-state transitions. The power-state controller has a configurable memory that can be used to store a power-state-transition script using the set of instructions. The power-state controller executes the script to effect a power-state transition of the processor. Additionally, the script can be modified by changing the contents of the configurable memory.

In many applications the power consumption of the power-state controller is critical to the overall system design due to the use of a limited power source. In other applications, the physical size of the power-state controller is critical to the overall system design. According to one embodiment of the present invention, the power-state controller is limited to an instruction set of less than 17 instructions. The power-state controller is optimized according to the limited instruction set to reduce the power consumption and size of the controller while still permitting flexibility in the functionality of the controller via a programmable memory.

The optimization of the instruction set is accomplished by limiting the instruction set to those instructions that are used in a power-state transition by a set of processors. For instance, during optimization of an instruction set, arithmetic operations (instructions used to perform an arithmetic function upon a number and to return the result of the arithmetic function) are excluded from the instruction set because they are implemented using arithmetic logic units (ALUs). Although various applications may define ALUs differently, as used herein, an ALU is defined as a circuit that receives data and performs addition, multiplication and subtraction functions upon the received data. The ALU's power-consumption and circuit space vary depending upon the type of arithmetic operations capable of being performed and the size of numbers used by the ALU (e.g., 16 bit numbers versus 32 bit numbers).

Another example of optimization includes limiting the data move instructions. Many instruction sets include data moves or instructions that store or retrieve data. Data moves perform functions such as sign extension, incremental address "pop" or "push" moves, and upper/lower byte moves. These instructions are typically implemented using, among other things, control logic and logical registers. Logical registers are registers independent of the instruction memory and contained within the processor whose data is controlled via various instructions. In one implementation, the data move instructions can be limited to write processes for which the data to be written is provided within the instruction. The writes also are limited in that they do not add pushes, shifts or other functionality to the write processes. Thus, the number of logical registers and the amount of control logic can be reduced.

This optimization procedure for producing a limited instruction set is carried out for various other operation types. Accordingly, the optimization of the limited instruction set includes optimization of branch, interrupt, system control, memory management, and other instruction types. In some instances, an entire instruction type may be limited such that it is not implemented in any form. In other examples, the processor can be optimized so as not to implement any logical registers by, for example, including necessary data within the instructions.

A specific example of such an optimization can be shown by beginning with the instruction set of an 8051 microprocessor. An 8051 microprocessor can be used to facilitate a power-state transition; however, such a processor implements 8 bits to define the operation codes, which allows for up to 256 instructions including many instructions that use an ALU. To optimize the instruction set and the corresponding microprocessor, many of the instructions can be selectively implemented. To begin with, the arithmetic instructions, including addition, subtraction, multiplication, decrement, increment, and divide related instructions, are removed from the instruction set. This exclusion allows the processor complexity to be reduced by eliminating the need for an ALU. Additionally, many of the logical operation instructions, including "and", "or", "xor", complement, and rotate related functions, are removed from the instruction set. Next, the data transfer instructions can be selectively implemented to reduce the total number of instructions and the associated circuitry necessary for their functionality. For example, data transfers between registers can be removed from the instruction set by limiting the data transfers to data retrieved directly from memory. Stack type data transfers (push and pop) are also removed from the instruction set. Finally, many of the bit manipulation and branch instructions can be selectively implemented. In this manner, the final instruction set can thus be reduced to less than 17 instructions, allowing for 4 bits or less to be used for operation code. Such a reduced instruction set may include 5 read or write instructions, 5 branch instructions, a delay instruction, and a comparison instruction.

FIG. 1 shows a power-state controller 106 for facilitating a power-state transition for processor system 102, according to an example embodiment of the present invention. Power-state controller 106 includes a configurable memory 110 and a control 108. Control 108 is designed to use a limited set of instructions for facilitating a power-state transition.

A user or designer of the system provides power-state script 114 for storage in configurable memory 110 to be used by control 108 when facilitating a power-state transition. Power-state script 114 consists of a sequence of instructions using the instruction set of control 108. The user or designer can change the functionality of control 108 by modifying or replacing the power-state script 114. This can be done, for example, to accommodate changes in the processor or application or to implement a design correction.

Upon receiving a request for a power-state transition, as shown in block 112, controller 108 begins executing the sequence of instructions stored in configurable memory 110 (i.e., power-state script 114). Controller 108 may perform a number of different power-transition functions, as shown in block 104, including writing data to registers, providing output signals to the processor system and receiving input signals from the processor system. These functions, among other functions, are implemented according to the power-state script, and thus, are configurable.

In one embodiment of the present invention, power-state controller 106 is designed to accommodate a limited instruction set. Thus, various components have reduced complexity as compared to processors that implement more complex instruction sets. For instance, where the power-state controller is implemented using a custom processor, the instruction decoding, arithmetic logic unit or instruction pipelining arrangements can be simplified. Other portions of the processor can also be simplified or selectively implemented (e.g., cache or branch-prediction). In some instances, the reduced complexity may allow for implementations of the power-state controller that require minimal power consumption and small physical sizes.

Figure 2:
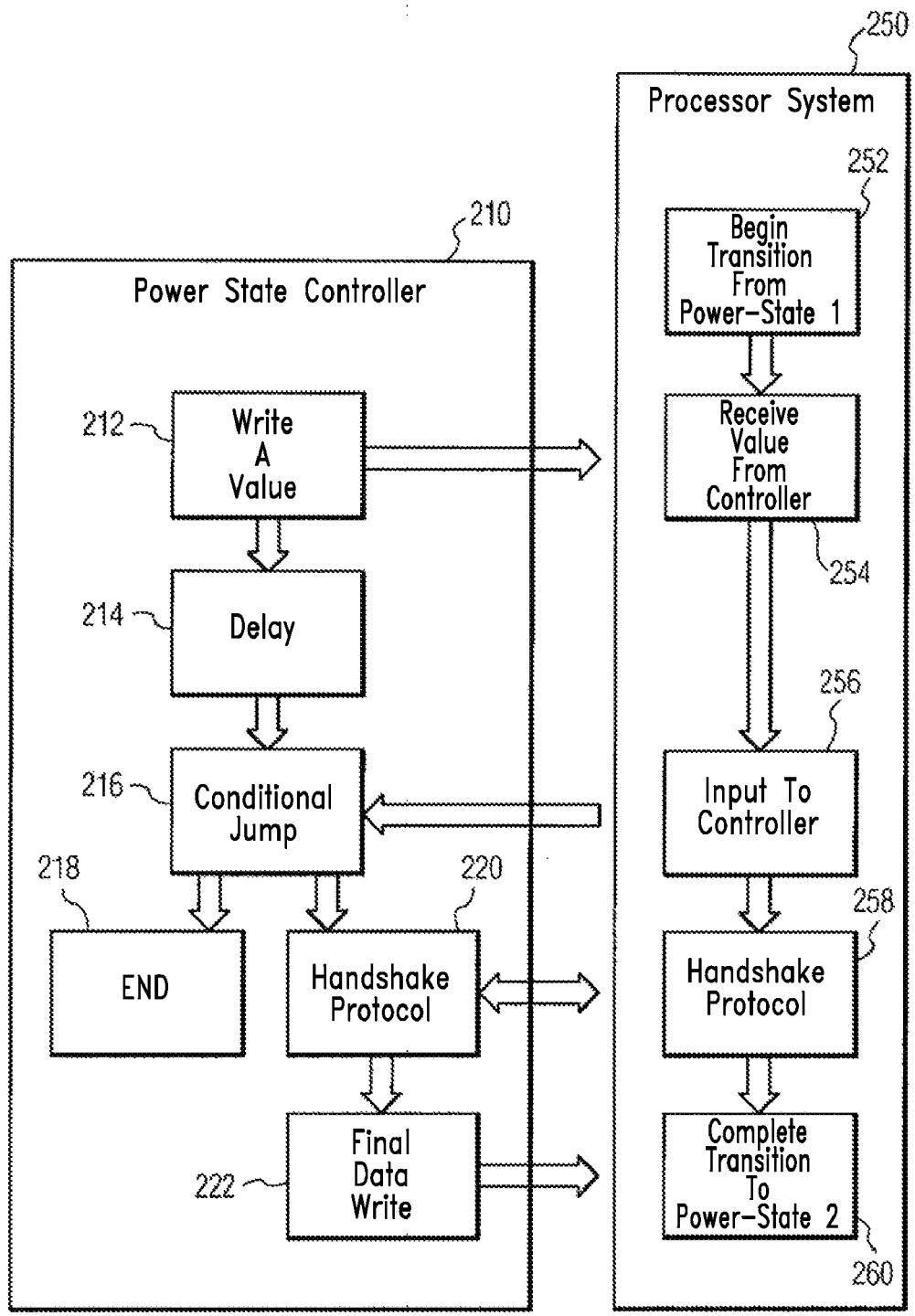
FIG. 2 shows an example implementation of a power-state script and the corresponding actions of a processor system, according to an example embodiment of the present invention.

Turning now to FIG. 2, FIG. 2 shows an example implementation of a power-state script and the corresponding actions of a processor system as depicted by power-state controller 210 and processor system 250.

Power-state controller 210 shows a series of power-state-transitions steps 212-222 that represent one possible series of steps implemented by power-state controller 210 to effect a power-state transition. Additionally, processor system 250 shows a series of power-state-transition steps 252-260 that represent one possible series of steps followed by processor system 250 to effect a transition from power-state 1 to power-state 2, as shown in blocks 252 and 260, respectively. As power-state controller 210 is configurable and can be implemented for different processor systems, such steps are merely representative and may vary from application to application.

In this instance, power-state controller 210 begins the power-state transition by writing a value to a component of processor system 250 as shown in block 212. Typically, this involves writing values to one or more registers of the processor system. For example, any of the processor, power supply, clock generators or chipset components may have one or more registers used to effect a power-state transition. Accordingly, the processor system begins the power-state transition as shown in block 254.

Next, power-state controller 210 implements a delay as depicted in block 214. Often, such a delay is necessary to allow the processor system to complete certain tasks. For instance, a processor may complete a power transition interrupt routine, a clock generator may need time to adjust to the new frequency, or a power supply may require time to adjust to a new voltage.

After the delay of block 214, the power-state controller executes a conditional jump based upon input from the processor system. The conditional jump is depicted in block 216, while the input from the processor system is shown by block 256 of the processor system 250. In one instance, the information may provide feedback as to whether the power-transition can proceed. Thus, if the condition is not met, the power-state controller may take appropriate action, such as writing a new value to processor system registers or simply ending the power-state transition (block 218). However, if the condition is met, the power-state controller continues the power-state transition as shown by block 220.

At block 220 the power-state controller implements a handshake protocol with the processor system. A handshake protocol typically involves one or more signals output from the power-state controller to the processor system, after which the power-state controller waits for a response signal from the processor system (block 258). Upon completion of the handshake, processor system 250 has completed the transition to power-state 2 (block 260) and power-state controller 210 performs a final data write (block 222). In an alternate implementation, the handshake protocol may include a delay during which the processor waits for a response signal. Upon completing the delay and determining that the response signal has not been received, the processor will cease monitoring the response signal and proceed with the power-state script. Such an implementation is applicable for several applications including recovery from a failed power-state transition.

The example process described above is merely representative of a possible implementation and may be modified by changing the power-state transition script stored in the memory of the power-state controller as well as by changing the processor system. In other embodiments, several power-state transitions can be handled by a single power-state transition script. For instance, power-state transitions in addition to power-states other than 1 and 2 can be implemented by using one or more conditional jumps based upon input that indicates the particular transition being requested. For instance, the power-state script may implement a loop that checks for inputs corresponding to the desired power-state transition. Such a loop continues to check the inputs until the processor system requests a power-state transition after which the power-state controller begins the appropriate power-state transition steps.

Figure 3:
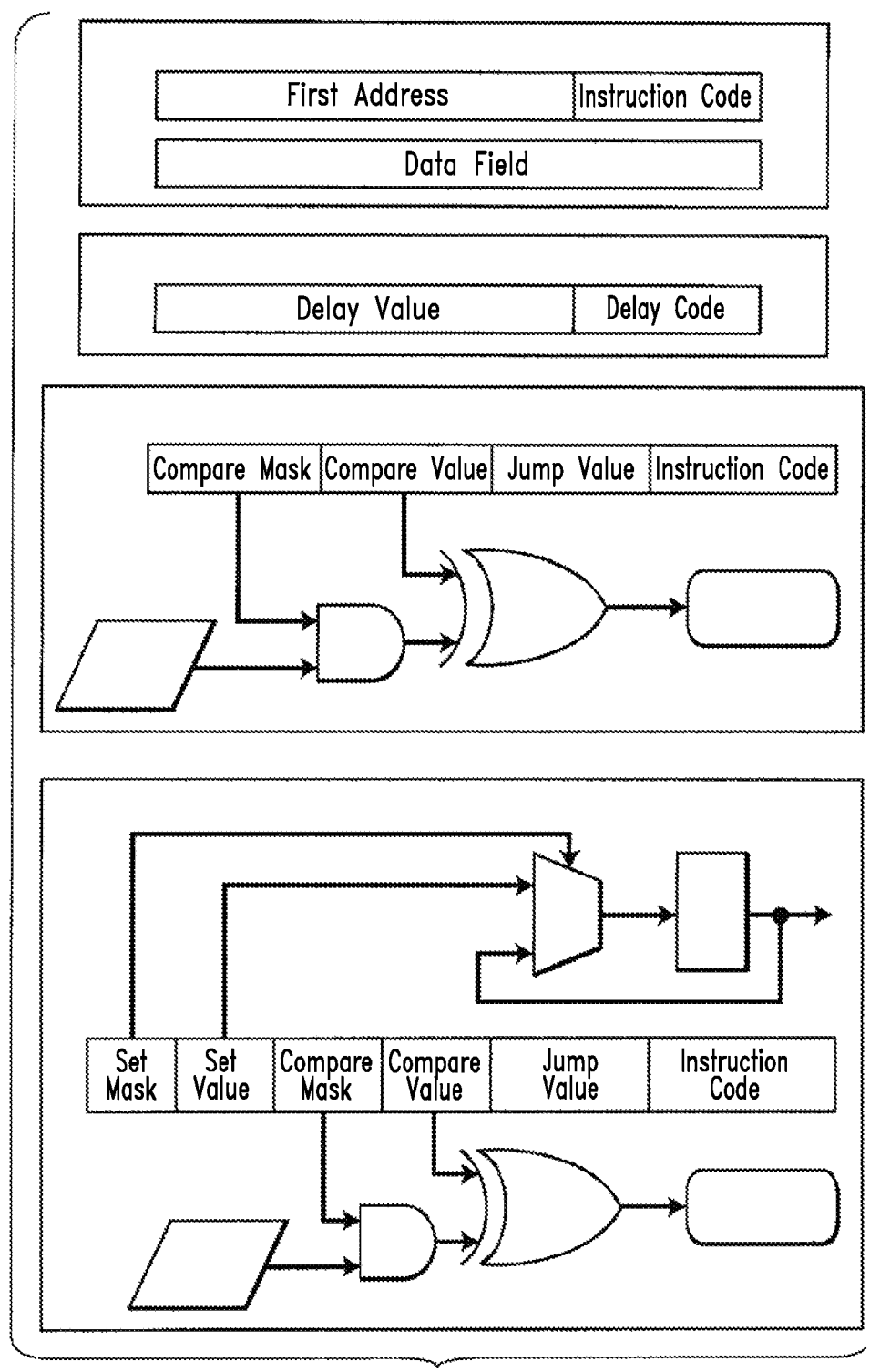
FIG. 3 is a diagram illustrating an example instruction set for a processor power management system, according to an example embodiment of the present invention.

FIG. 3 shows an example instruction set of a power-state control according to one embodiment of the present invention. In this instance, the instruction set is implemented using a total of four instructions consisting of instructions for a data write, a delay, a conditional jump and a handshake. The limited number of instructions decreases the complexity of the power-state control, and accordingly, it is possible to design the power-state controller with a reduced the power consumption and physical size.

The data write instruction is shown as having fields for a first address and instruction code followed by a data field. For instance, where the power-state control device is a 32 bit device, the first address and instruction code fields can be 32 bits long and the data can also be 32 bits long. Other implementations are possible, including an instruction that includes each of the data, address and instruction code in 32 bits. The address is used to indicate the location for writing the data. Examples of locations for storing data include clock generator registers, power supply registers, processor memory, chipset registers and other locations.

The delay instruction is shown as having a delay value followed by the delay instruction code. When the power-state controller receives a delay instruction, it will not process the next instruction until after an amount of time represented by the delay value. The power-state controller implements the delay using a suitable method, such as a counter or timer. In an alternate embodiment, one or more no-operation (nop) instructions can be implemented in place of a delay.

The conditional jump instruction is shown as having a compare mask, a compare value, a jump value and an instruction code. The power-state controller implements a conditional jump by first determining whether to execute the next instruction or to "jump" to an instruction indicated by the jump value. The determination is carried out by comparing the compare value to an input value modified by the compare mask. For instance, a compare mask and compare value may consist of 4 bits, and the power-state controller has 4 inputs that are used in the compare process. The compare mask is used to indicate which of the 4 inputs are to be compared against the compare value. Thus, bits that are not to be compared are indicated as such by using the mask value. Accordingly, the corresponding input values are "masked" so as not to be used in determining whether to jump. The unmasked inputs are compared against the compare value, and upon determining that the values match the power-state controller jumps to an instruction as indicated by the jump value and the current instruction location. In some instances, the conditional jump can be used as an unconditional jump by masking all the input values. Thus, the power-state controller will take the jump regardless of the input.

The handshake instruction is shown as having a set mask, a set value, a compare mask, a compare value, a jump value and an instruction code. Often, a handshake instruction is implemented by providing an output from the power-state controller after which the power-state controller compares the unmasked inputs to the compare value to determine whether to jump to the instruction indicated by the jump value. The handshake instruction can be implemented such that the power-state controller waits for the compare value before executing additional instructions. Alternatively, the handshake instruction may be implemented by either jumping to the instruction indicated by the jump value or by executing the next sequential instruction. Using such an implementation, the power-state controller can be configured to wait using an instruction that jumps back to the handshake instruction.

In another implementation, the handshake instruction is implemented such that the power-state controller delays for a period of time after providing the output signals. During the delay, the power-state controller monitors the input signals to determine whether to take the jump indicated by the jump-value. After the delay has been implemented and where the appropriate input has not been received, the next sequential instruction is executed. Such a delay can be configurable by including instruction bits for the delay, or it may be a predetermined delay time.

Figure 4:
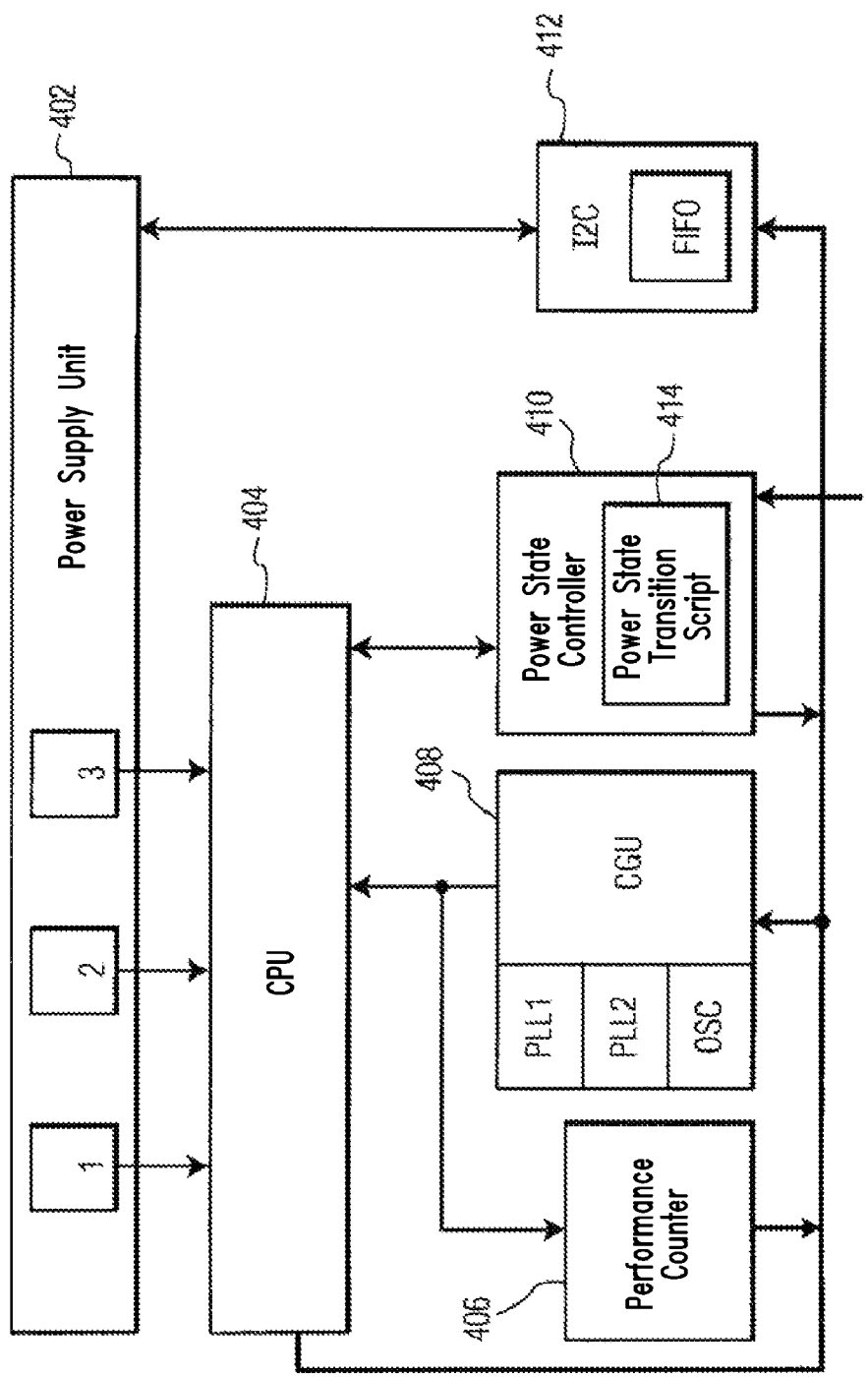
FIG. 4 is a block diagram of a processor power management system, according to an example embodiment of the present invention.

FIG. 4 depicts a block diagram of a processor-power-management system, according to an example embodiment of the present invention. The system includes a power-state controller 410, a central processing unit (CPU) 404, a clock generator unit (CGU) 408, an inter-integrated circuit (I2C) interface 412, a power supply unit 402 and a performance counter 406.

The system is configured to implement dynamic voltage and frequency scaling (DVFS) initiated by software running on the CPU. One such system is implemented using an ARM® powered processor (ARM® powered is a register trademark of ARM Limited). The DVFS software determines that a power-state transition is desired based upon its code and inputs, such as inputs from performance counter 406. For instance, if the performance counter indicates that the processor has idle time, the DVFS software might determine that the processor should enter a lower power-state to save power. The DVFS software provides an indication of the power-state transition to power-state controller 410. The indication can be accomplished using, for example, a bus interface (e.g., frontside processor bus or I2C bus) or by hardwired signals (e.g., interrupt lines or other signal lines). In one instance, the DVFS software does not monitor or otherwise assist the power-state transitioning once it has provided the power-state controller 410 with a transition indication. After receiving such an indication, the power-state controller 410 performs multiple functions, several of which are discussed herein, by executing a set of procedures detailed in power-state transition script 414. For instance, the power-state transition script 414 may call for a handshake procedure with CPU 404 or for a frequency and voltage modification information to be written to CGU 408 and power supply unit 402, respectively.

In addition, power-state controller 410 may interface with other devices, such as I2C device 412. I2C device 412 facilitates communications between power supply unit 402 and power-state controller 410 by, for example, translating from one communications protocol to another. Accordingly, power-state-transition script 414 may be configured to write data to the I2C device 412. The I2C device 412 then uses the data to implement a change in the voltages provided by power supply unit 402. This data may correspond to register values of the power supply unit 402, such as those shown by reg1, reg2 and reg3. Another possible device that the power-state controller 410 may interface with is CGU 408. CGU 408 might also be configured by writing a value to registers. For instance, the register value may represent phase-locked loop (PLL1 and PLL2) clock frequencies provided to CPU 404 as derived from a local oscillator (Osc).

By modifying the power-state-transition script 414, power-state controller 410 can be used in numerous processor systems, or used in a different manner for the same processor system. In another application, multiple power-state controllers can be used in the same system. This may be advantageous where, for example, one controller does not provide enough inputs or outputs to effect a power-state transition, or for processor systems that contain multiple processors.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, applications other than microprocessors may be amenable to implementation using similar approaches. In addition, one or more of the above example embodiments and implementations may be implemented with a variety of approaches, including digital and/or analog circuitry and/or software-based approaches. The above example embodiments and implementations may also be integrated with a variety of circuits, devices, systems and approaches including those for use in connection with cellular phones, laptop computers and handheld computing devices. These approaches are implemented in connection with various example embodiments of the present invention. Such modifications and changes do not depart from the true scope of the present invention that is set forth in the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power-state transitioning circuit arrangement, comprising:
    an instruction set;
    a power-state-transition script including at least some of the instructions in the instruction set;
    a memory circuit structured to store the power-state-transition script; and
    a first processing circuit that does not include an arithmetic-logic-unit and is configured to facilitate a change in a power-state of a second processing circuit using the power-state transition script;
    wherein the instruction set consists of a write instruction, a delay instruction, a conditional jump instruction and a handshake instruction.

2. The power-state transitioning circuit arrangement of claim 1, wherein the first processing circuit and the memory circuit are implemented on a single integrated-circuit.

3. The power-state transitioning circuit arrangement of claim 1, wherein the first processing circuit is structured to facilitate a change in a power-state in response to an input external to the power-state transitioning circuit arrangement.

4. The power-state transitioning circuit arrangement of claim 3, wherein the power-state-transition script is structured to be modified while the power-state transitioning circuit arrangement is electrically connected to the second processing circuit.

5. The power-state transitioning circuit arrangement of claim 1, wherein the power-state transitioning circuit arrangement includes a modification of one of a clock frequency and a power supply voltage of the second processing circuit.

6. The power-state transitioning circuit arrangement of claim 1, wherein the first processing circuit does not contain logical registers.

7. A power-state transitioning processor arrangement, comprising:
 an instruction set having a write instruction, a conditional jump instruction, a delay instruction and a handshake instruction;
 a configurable memory circuit having stored instructions corresponding to instructions of the instruction set; and
 a secondary processor that is structured to facilitate a power-state transition of a main processor circuit using the instructions stored in the memory circuit, the processor being integrated with the main processor circuit.

8. The power-state transitioning processor arrangement of claim 7, further including a bus interface, a set of input signals and a set of output signals.

9. The power-state transitioning processor arrangement of claim 7, wherein the instruction set has less than 17 instructions.

10. The power-state transitioning processor arrangement of claim 7, wherein the secondary processor does not contain an ALU.

11. The power-state transitioning processor arrangement of claim 10, wherein the secondary processor does not contain logical registers.

12. A system, comprising:
 a memory circuit structured to store a power-state-transition script that includes instructions from an instruction set; and
 a first processing circuit structured to facilitate a change in a power-state of a second processing circuit using the power-state transition script, the first processing circuit not having an arithmetic-logic-unit;
 wherein the instruction set includes a write instruction, a delay instruction, a conditional jump instruction, and a handshake instruction.

13. The system of claim 12, wherein the instruction set has less than 17 instructions.

14. The system of claim 12, wherein the first processing circuit does not include an arithmetic logic unit.

15. The system of claim 14, wherein the first processing circuit does not include logical registers.

16. A power-state transitioning circuit arrangement, comprising:
 an instruction set that includes a write instruction, a delay instruction, a conditional jump instruction, and a handshake instruction;
 a power-state-transition script including at least some of the instructions in the instruction set;
 a memory circuit structured to store the power-state-transition script; and
 a first processing circuit that does not include an arithmetic-logic-unit and that is structured to facilitate a change in a power-state of a second processing circuit using the power-state transition script.

17. The power-state transitioning circuit arrangement of claim 16, wherein the first processing circuit and the memory circuit are implemented on a single integrated-circuit.

18. The power-state transitioning circuit arrangement of claim 16, wherein the first processing circuit is structured to facilitate a change in a power-state in response to an input external to the power-state transitioning circuit arrangement.

19. The power-state transitioning circuit arrangement of claim 18, wherein the power-state-transition script can be modified while the power-state transitioning circuit arrangement is electrically connected to the second processing circuit.

20. The power-state transitioning circuit arrangement of claim 16, wherein the power-state transitioning circuit arrangement includes a modification of one of a clock frequency and a power supply voltage of the second processing circuit.

21. The power-state transitioning circuit arrangement of claim 16, wherein the first processing circuit does not contain logical registers.

* * * * *